Nov. 5, 1968   J. M. PATTERSON   3,409,221
METHOD OF AND APPARATUS FOR DISTRIBUTING AGRICULTURAL CHEMICALS
Filed May 23, 1966   4 Sheets-Sheet 1
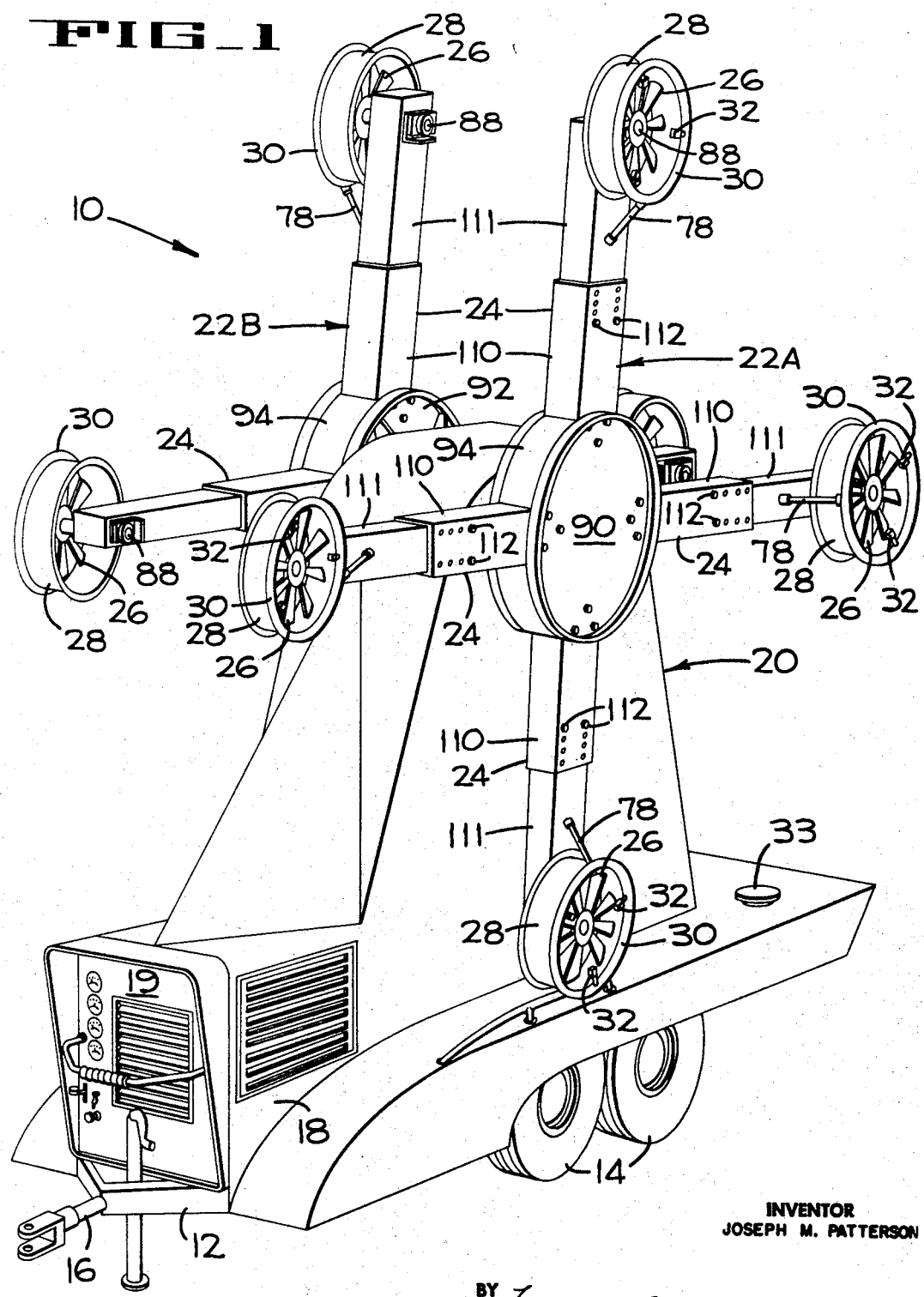
FIG_1
INVENTOR
JOSEPH M. PATTERSON
BY *Francis W. Anderson* ATTORNEY Nov. 5, 1968                J. M. PATTERSON                3,409,221
              METHOD OF AND APPARATUS FOR DISTRIBUTING AGRICULTURAL CHEMICALS
Filed May 23, 1966                                        4 Sheets-Sheet 2
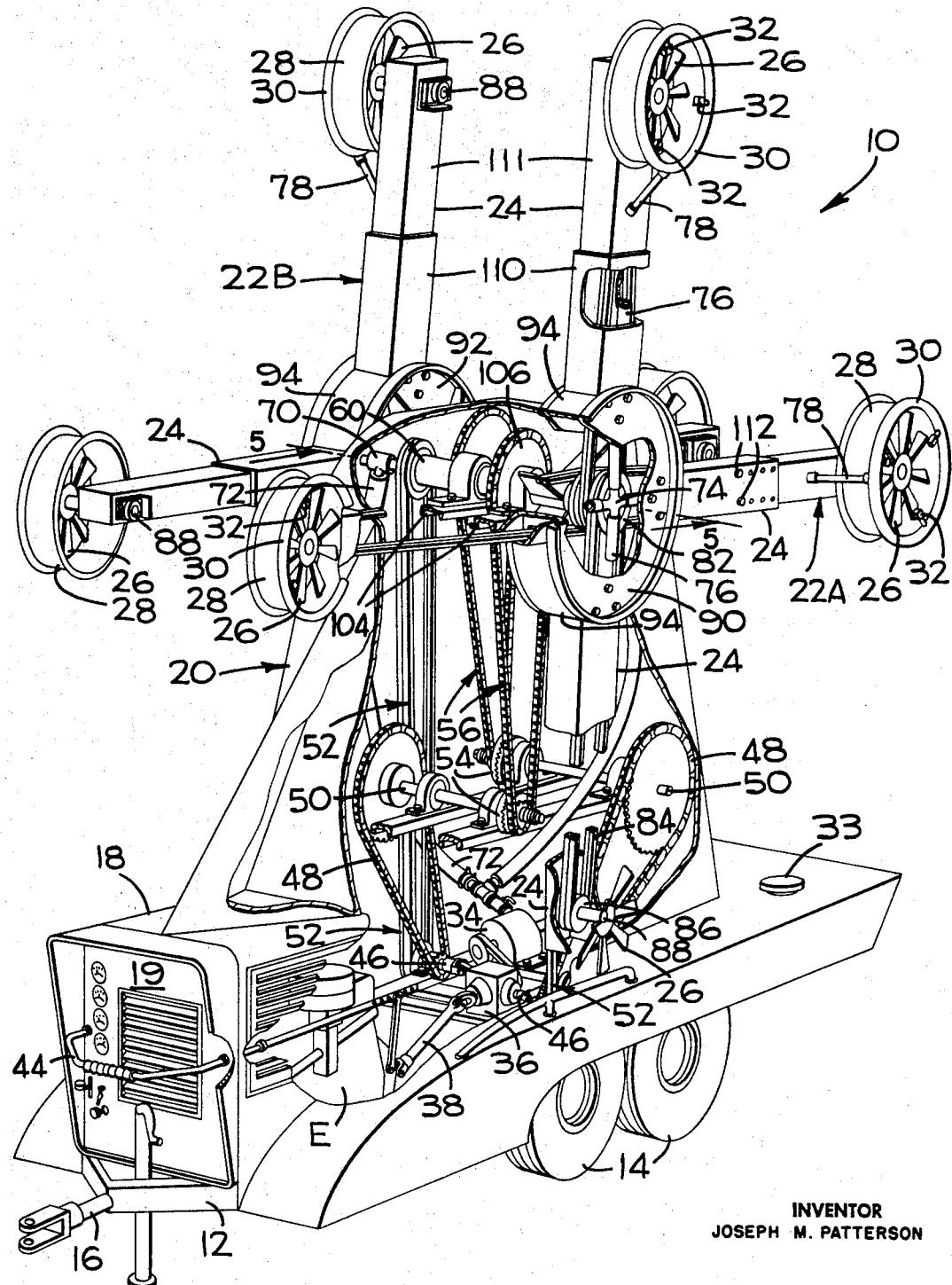
INVENTOR
JOSEPH M. PATTERSON
BY *Francis W. Anderson* ATTORNEY

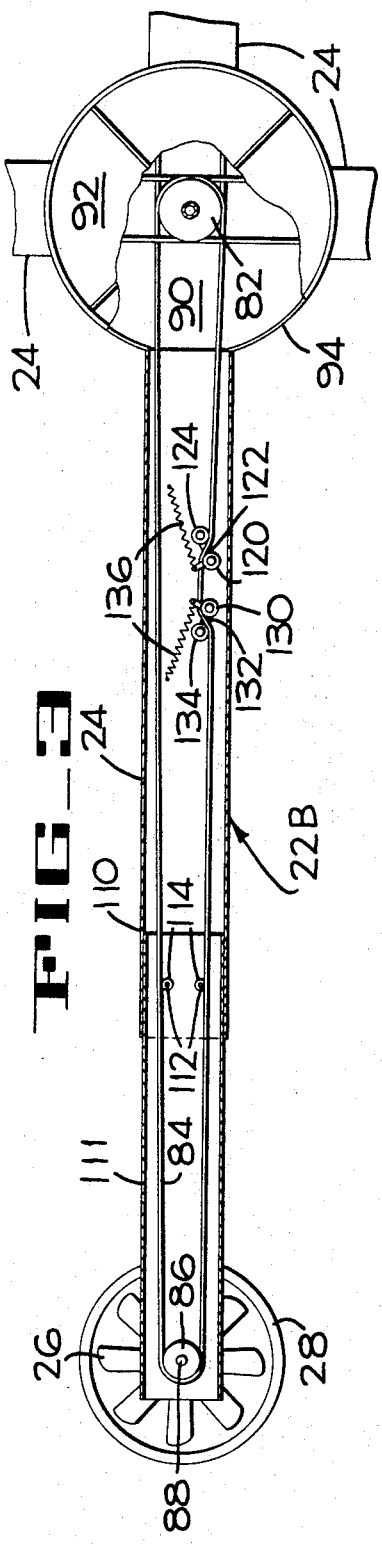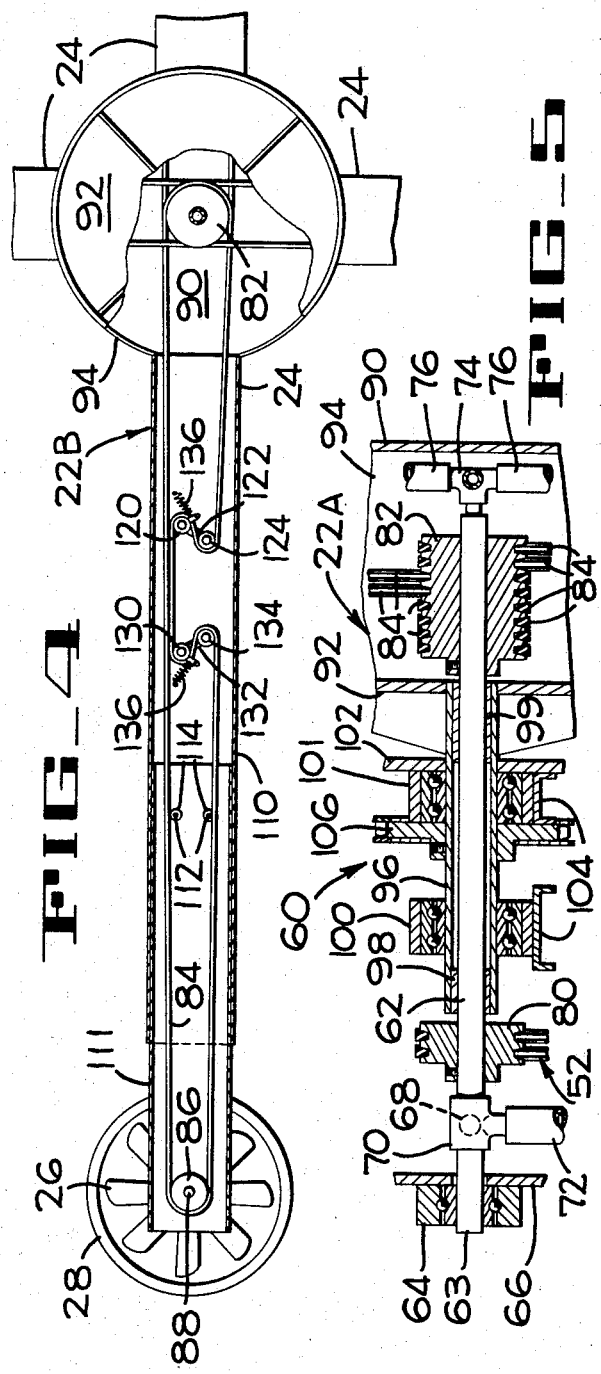

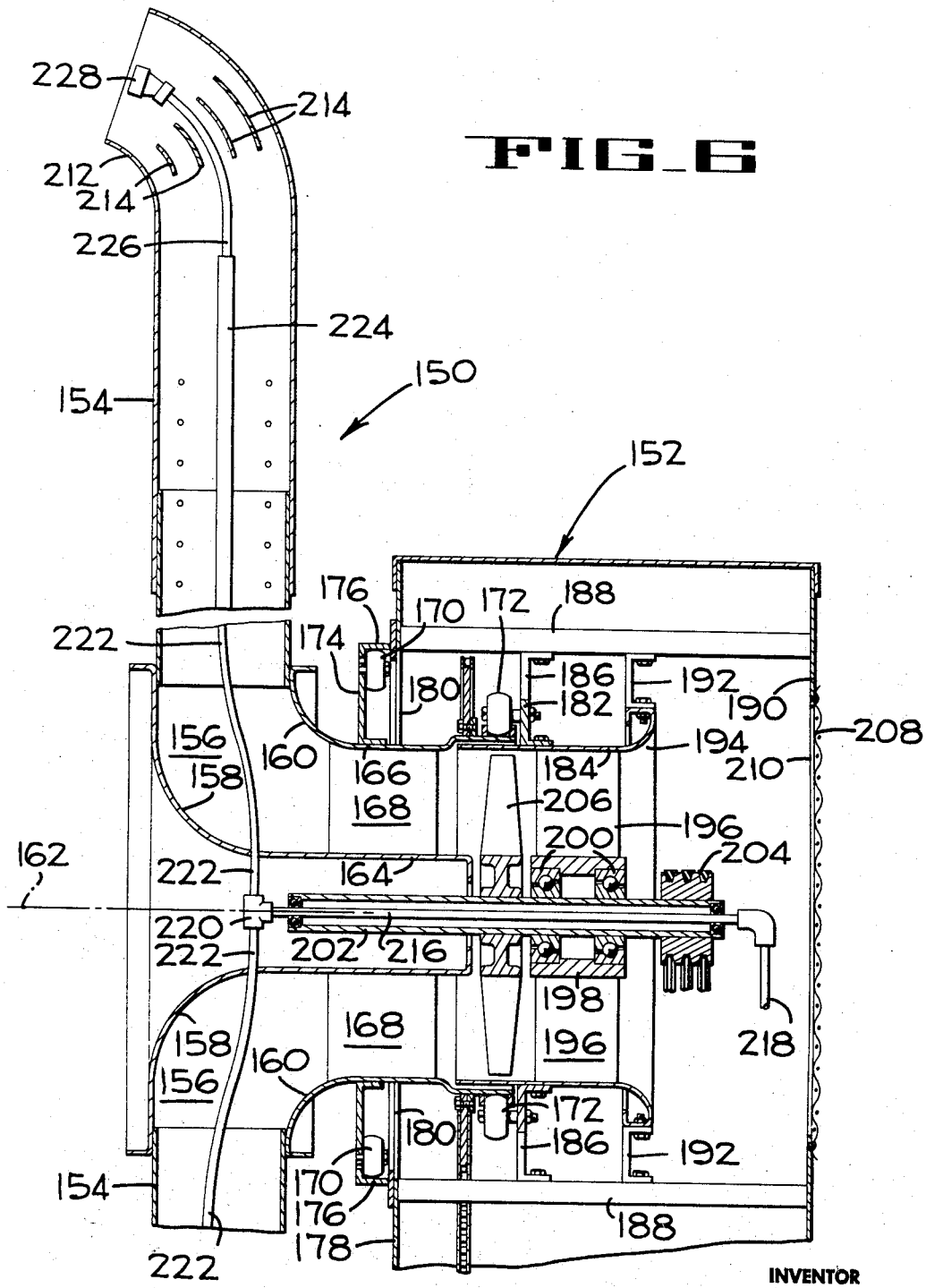

United States Patent Office 3,409,221
Patented Nov. 5, 1968

3,409,221
METHOD OF AND APPARATUS FOR DISTRIBUTING AGRICULTURAL CHEMICALS
Joseph M. Patterson, Winter Park, Fla., assignor to FMC Corporation, San Jose, Calif., a corporation of Delaware
Filed May 23, 1966, Ser. No. 552,105
8 Claims. (Cl. 239—8)

ABSTRACT OF THE DISCLOSURE

An apparatus directs an air blast towards a row of trees to carry spray, prevent frost damage or shake for harvesting and includes a vehicle upon which a rotor is mounted having a radial arm that carries at its free end means for discharging an air blast. Upon rotation of the rotor, the means for discharging an air blast is carried to the trees, thus reducing the flight distance therebetween. A spray pattern resulting covers a substantial area as represented by a series of circular paths, traced by the free end of the rotor arm, with each circle being offset by the amount of linear movement of the vehicle between each revolution. Oscillation of the tree branches is provided by the reverse direction of motion on opposite sides of the circular path and this results in improved penetration of the spray.

The present invention pertains to agricultural sprayers, and more particularly concerns both an apparatus and a method for dispensing powdered or liquid chemical upon orchard trees.

It is now common practice for citrus fruit orchardists to mechanically prune rows of trees with hedging machines which trim the sides of the trees. As a consequence of this type of pruning, the spaces between the trees are overgrown more rapidly than if the trees were pruned in the previous manner of pruning all of the branches. This dense foliage makes the efficient application of pesticides more difficult, and it has been found that adequate covering of the hidden foliage is not always attained with the spraying apparatus now in general use.

The present invention provides a method and apparatus for carrying out an improved air blast penetration of densely foliated trees, and for obtaining an improved coverage of the foliage with an agricultural chemical entrained in the air blast. These results are in general made possible by a vehicle-mounted rotor which disseminates an air blast with entrained chemicals from its peripheral portions as the vehicle moves along a row of orchard trees.

An object of the present invention is to provide an improved air blast disseminating means for an agricultural spraying or dusting machine.

Another object of the invention is to provide an agricultural spraying apparatus having improved means for projecting an air blast through dense foliage.

A further object is the provision of an improved orchard sprayer which is capable of simultaneously spraying each of the confronting surfaces of adjacent rows of orchard trees.

Another object is to provide an orchard sprayer in which the spray pattern is oscillated over the full height range of orchard trees.

Another object is to provide an improved method of dispersing agricultural chemicals.

Another object is to provide an improved apparatus for dispensing agricultural chemicals by entraining the chemicals in a substantially horizontal air blast which is arranged to traverse an orbital path in a vertical plane.

Another object is to provide an improved orchard sprayer which can be regulated to provide the optimum

2 spray coverage for trees, shrubs, vines and other crops of different height.

Other objects and advantages of the present invention will become apparent from the following description and from the accompanying drawings, wherein:

FIGURE 1 is a schematic perspective of a preferred embodiment of the apparatus of the present invention.

FIGURE 2 is a schematic perspective similar to FIGURE 1, but partly broken away to show various drive structures and pumping arrangements which would otherwise be concealed.

FIGURE 3 is a fragmentary schematic elevation, partly broken away, which illustrates interior drive mechanism in one of the telescopic rotor arms shown in FIGURES 1 and 2, the rotor arm being in an extended position.

FIGURE 4 is a schematic elevation, similar to FIGURE 3, but with the rotor arm in a retracted position.

FIGURE 5 is a schematic vertical section, taken along lines 5—5 on FIGURE 2, through one of the rotor hubs.

FIGURE 6 is a fragmentary, schematic vertical section of a modified rotor arm constructed according to the present invention.

Briefly, the embodiment of the improved spraying apparatus 10 illustrated in FIGURES 1 and 2 is a self contained unit arranged to be towed through an orchard grove by a tractor, and includes a frame 12 having support wheels 14 and a draw bar 16 for coupling the unit to the tractor. A gasoline engine power unit E is mounted on the forward end of the frame in a louvered housing 18 and has its controls mounted on a front panel 19 which is readily accessible to the driver of the tractor.

A hollow tower 20 projects upward from the frame 12 and encloses various mechanisms including power trains which drive a rotor assembly 22A at one side of the tower and a rotor assembly 22B at the other side of the tower. Each rotor assembly 22A and 22B includes four equally spaced, hollow telescopic arms 24. The distal end of each arm carries an axial flow air impeller 26 which is mounted inside an annular shroud 28 having a coaxial hollow manifold ring 30. The manifold ring supplies spray material to a plurality of radially inwardly directed liquid spray nozzles 32 that are mounted on the ring and project a chemical solution into the air blast of the impeller.

More specifically, and with particular reference to FIGURE 2, the frame 12 is substantially enclosed by sheet metal panels and carries a liquid spray supply tank, not shown, which can be filled through a filler neck and cap 33. The supply tank communicates with the suction inlet of a discharge pump 34 that is coupled to a gear box 36, which is in turn powered by a drive shaft 38 coupled to the engine E. The engine E is provided with conventional clutch means operable by a clutch actuating lever 44 that is mounted on the engine control panel 19. When the lever is pulled forward, the gear box 36 is driven by the engine.

A lateral output shaft 46 at each side of the gearbox 36 is connected by a chain and sprocket drive assembly 48 to individual rotor jackshafts 50 that respectively transfer motor power to the rotor assemblies 22A and 22B. Each output shaft 46 is also provided with a pulley and belt drive assembly 52 which is arranged to drive the impellers 26 of the rotors 22A and 22B while the rotors are revolving under power supplied by other drive trains coupled to the rotor jackshafts 50. In order to prevent damage to the rotors, each rotor jackshaft 50 is connected to a jaw clutch 54 which releases at a predetermined force so that, if a rotor is accidentally stopped, such as by striking a tree limb, the drive train of the rotor will not be damaged.

The driven element of each jaw clutch is coupled by a separate chain and sprocket drive train 56 to a hollow rotor shaft and hub assembly 60, only the near rotor shaft and hub assembly 60 being shown. The other rotor shaft and hub assembly is of similar construction, but is reversely oriented in the machine. It should be mentioned that it is not necessary that a separate rotor shaft and hub assembly and associated drive train be provided for each rotor 22A and 22B. A single, common assembly can be used to mount and drive both rotors after obvious modifications which involve only mechanical skill; the main advantage of using a single rotor shaft is in a certain economy of parts and construction costs.

The central portion of the rotor shaft and hub assembly 60 (FIG. 5) comprises a hollow shaft 62 with a blind outer end 63. The outer end portion of the shaft is rotatably mounted in an outboard bearing 64 that is secured to an adjacent wall 66 of the tower 20. The central bore of the shaft 62 is provided with one or more radial apertures 68 with which the hollow interior of the shaft communicates with the interior of a swivel coupling 70.

Liquid pesticide or the like is conducted into the swivel coupling 70 through a flexible conduit 72 (FIG. 2) which at its lower end communicates with the discharge outlet of the pump 34. At its other end the hollow shaft 62 (FIG. 5) is connected to a fitting 74 having four equally spaced legs which are each connected to a conduit 76. The conduits 76 extend outward through the rotor arms 24 and are each connected to a pipe 78 (FIG. 1). Each pipe 78 communicates with the adjacent manifold ring 30 to supply liquid material to the spray nozzles 32. Each conduit 76, although not illustrated in detail, is of a well known telescopic construction of slidably interfitted large and small tubular sections, with suitable sealing means therebetween, whereby the conduit can accommodate lengthening or shortening of the telescopic rotor arm 24 in which it is mounted.

In addition to the function of supplying liquid spray material to the rotor arms 24, the hollow shaft 62 (FIG. 5) acts as a drive shaft to provide power to rotate the air impellers 26 on the distal ends of the rotor arms. For this purpose, a sheave 80 is secured to the shaft 62, adjacent the swivel coupling 70, as a part of the pulley and belt drive assembly 52. The other end portion of the shaft 62 has a multi-groove sheave 82 secured thereto, around which four sets of dual V-belts 84 are trained and extend outward in pairs through each rotor arm 24. Provision is made for adjusting the effective length of the V-belts 84, and is later described in conjunction with FIGURES 3 and 4; as shown in these figures, the outer loop of each pair of V-belts is trained around a sheave 86 which drives a shaft 88 that is journaled in the associated rotor arm and is keyed to the impeller 26.

The hub portion of the rotor 22A (FIG. 5) includes an outer disc 90, an inner disc 92, and a cylindrical ring 94 to which are welded the inner ends of the rotor arms 24 (FIG. 2). Secured to, and extending inward from the inner disc 92, in circumscribing relation to the hollow shaft 62, is a sleeve 96. The sleeve is mounted for rotation relative to the shaft 62 by means of interposed bearings 98 and 99, and is rotatably mounted in ball bearings 100 and 101, the latter of which lies within an adjacent wall 102 of the tower 20. The bearings 100 and 101 are each bolted to fixed support channels 104.

Between the bearings 100 and 101, a drive sprocket 106 is secured to the bearing sleeve 96. The drive sprocket 106 is a part of the chain and sprocket drive train 56 for the rotor 22A. By means of the above described rotor hub structure, the rotor 22A is driven at relatively low speed, that is, below 30 revolutions per minute, while the impellers 26 are rotated at relatively high speed, for example, above 1000 revolutions per minute. While the rotor and impeller speeds are fixed relative to each other, their actual speeds are of course dependent upon the throttle setting of the engine E.

It will be understood that the preceding description, although it is directed to the rotor 22A and its drive train, is equally applicable to the rotor 22B and its drive train, the only difference being the reverse orientation of the parts for the rotor 22B, relative to the tower 20. Thus, the hub portion of the rotor 22B (FIGS. 3 and 4) also includes an inner disc 92, a cylindrical ring 94, and an outer disc 90 in coaxial arrangement with a sheave 82. The inner end portion of each of the rotor arms 24, as in the case of the rotor arms 24 (FIG. 1) for the rotor 22A, is a rectangular tubular member 110 which slidably receives an inner tubular member 111 of corresponding shape. Means for locking the two tubes together, when the desired overall length is attained by manually extending or retracting the innermost tube, is by bolts 112 (FIG. 1) which are inserted in apertures in the outer tubular member and are threaded into bosses 114 welded to a wall of the inner tubular member. The difference in the overlapped portions of the inner and outer tubular members and the difference in their over-all lengths, both as contrasted between FIGURES 3 and 4, indicate the effect of the telescopic adjustment above described.

Since the distance between the sheaves 82 and 86 for the impeller drive belts 84 varies according to the adjusted length of each rotor arm 24, means are provided to take up any belt slack when the rotor arm is shortened. For this purpose, one flight of each belt 84 is trained around a dual pulley assembly including a movable pulley 120 that is mounted upon a swing arm 122. The swing arm is pivoted at the turning axis of a stationary, rotatable pulley 124. The same flight is trained around a movable pulley 130 that is mounted on a swing arm 132, which is rotatable about the turning axis of a stationary pulley 134. The swing arms 122 and 132 are each urged away from the other by a tension spring 136 whereby the interposed belt flight between the pulleys 120 and 130 is tensioned and is thereby taken up in accord with telescopic adjustment of the rotor arm 24.

It will be apparent that the adjusted lengths of the rotor arms need not be the same. The particular utility of having the rotor arms adjusted to different lengths is that the rotary paths of the air impellers can thus be different if the foliage to be sprayed is less dense than the heavy foliage which can be penetrated when all air impellers follow the same rotary path. It will also be apparent that shut-off valves can be incorporated in the liquid spray conduits extending through each rotor arm so that only selected ones of the spray manifolds 30 discharge the chemical solution being applied. In such case a somewhat greater dispersal of the spray is effected because all of the impellers 26 continue to discharge air blasts, and the air to spray ratio is thus increased.

The modification of the present invention illustrated in FIGURE 6 provides a common air blast source for the rotor arms, thus providing simpler and less costly spraying apparatus. Additionally, the modified structure is readily adaptable to handle chemical dusts as well as liquid spray, although the hollow rotor arms 24 of the previously described embodiment of the invention obviously suggest to those skilled in the art that they can be used to conduct chemical dusts to the impellers 26. To achieve dust distribution instead of liquid chemical distribution, the pump 34 is replaced by a dust generator, the liquid spray supply tank is replaced by a dust hopper, and the dust can be conveyed through supply lines within the rotor arms, or by the rotor arms themselves, to dust nozzles adjacent the air impellers 26. It will be apparent that both dust apparatus and liquid spray apparatus can be incorporated into one spraying machine.

The rotor 150 (FIG. 6) is mounted for rotation in the same plane as the rotor 22B (FIG. 1) at one side of a tower structure 152 which is similar to the tower 20. The support vehicle for the tower 150 is essentially the same as the vehicle previously described, and the rotor 150 may include two or more diametrically opposed hollow arms 154 which communicate with an annular air discharge passage 156. Passage 156 lies inwardly from the flared end portions of an inner bell-shaped shroud 158 and an outer bell-shaped shroud 160, and is directed radially outward from the axis of rotation 162 of the rotor 150. Shrouds 158 and 160 have cylindrical walls 164 and 166, respectively, which are symmetrically disposed about the axis 162, and which are interconnected by a plurality of radial air-straightening vanes 168. The shrouds and the rotor arms which they support are thus unitary, and are rotatably supported by means including a plurality of rollers 170 and a similar set of rollers 172.

The rollers 170 are carried by a ring 174 having a flanged inner end portion that encircles and is secured to the cylindrical wall 166 of the outer shroud 160. A track for the rollers 170 is provided by a split ring 176 that is secured to the adjacent wall 178 of the tower 152 and surrounds a circular aperture 180 in said wall which facilitates assembly and repair of the mechanism lying within the tower. Rollers 172 are carried by a ring 182, which is similar to the ring 174 and has an inner flange encircling and secured to an impeller shroud 184 that nests partially within the enlarged adjacent end portion of the wall 166. Outwardly extending angle pieces 186 are welded to the ring 182 and bolted to fixed support bars 188 which extend between the tower wall 178 and an opposite tower wall 190. Further support of the impeller shroud 184 is obtained by angle pieces 192 that are secured to the fixed support bars 188 and to a bell end air inlet at 194 which forms the air intake throat of the impeller shroud 184.

The interior of the impeller shroud is provided with a plurality of fixed, radial support vanes 196 which are secured to a central hub 198. Ball bearings 200 are mounted in each counterbored end of the hub and rotatably support a hollow drive shaft 202. The driveshaft is powered by a V-belt and sheave drive train 204 and carries an axial-flow impeller 206 which is positioned between the vanes 168 and 196 for thrusting an air blast outward into the annular passage 156 for delivery of the air blast radially outward through the hollow rotor arms 154. Inlet air for the impeller is supplied through a screen 208 that covers an aperture 210 in the tower wall 190.

The outer end portion of each rotor arm 154 is formed with an outwardly curved section 212 having interior vanes 214 to make the air flow follow the path of curved end. As illustrated, the curved section 212 projects the air blast along a path diverging outward from the rotational axis 162 so that the rotor diameter can be substantially less than the height of the tree foliage, but the curved section can obviously be formed to suit predetermined operational conditions or can have an auxiliary, removable curved conduit section secured thereto in order to accommodate other operational conditions.

Concentrically mounted within the hollow driveshaft 202 is a stationary conduit 216 which is supplied with liquid under pressure through a conduit 218. A T swivel coupling 220 is rotatably mounted on the outer end of the stationary conduit 216 and is connected to lines 222 which individually extend outward through the corresponding rotor arm 154. Each line 222 is coupled to a telescopic pipe setcion 224, only one of which is shown, that accommodates extension or retraction of the rotor arm. The outer end of the telescopic section is coupled to a conduit 226 which terminates in communication with a spray head 228 that atomizes the spray liquid for entrainment in the air blast.

When either of the disclosed embodiments of the invention are to be placed in operation, the length of the rotor arms 24 or 154 are adjusted to accommodate the known spraying requirements of the orchard. If the trees to be sprayed have extremely dense foliage, the rotor arms are preferably adjusted to be of the same length so that any one give area of a tree will be subjected to the air blast of all of the rotor arms. The lowest and highest foliage to be sprayed will determine the adjusted lengths of the rotor arms. If only light spray coverage is desired at the tops and bottoms of the trees with intermediate deep penetration, the rotor arms can be adjusted to different lengths so that there is little vertical overlap of the spray patterns. The horizontal overlap will depend upon the speed with which the spray apparatus is moved along the row of trees, and the rotational speed of the rotors. In the case of the spray apparatus shown in FIGURE 1, the confronting sides of two rows of trees can be sprayed simultaneously, but it will be apparent that the FIGURE 6 embodiment of the present invention can with ordinary mechanical skill be provided with dual rotors to accomplish the simultaneous spray coverage of adjacent rows of trees. Both forms of the spray apparatus effect a very efficient dispersal of the spray material and deep penetration of dense foliage due to the orbital movement of the spray discharge structure. Further, both sprayers are effective in the rapid spray coverage of low crops, such as grape vines, because the multiple air blasts, when they follow the same orbital path, project the spray to considerable distance.

While particular embodiments of the present invention have been shown and described it will be understood that the particular details herein set forth are capable of modification and variation without departing from the principles of the invention and that the scope of the invention should be limited only by the scope and proper interpretation of the claims appended hereto.

For example, a rotor having only one rotor arm with a suitable counterbalance can be used to replace either or both rotor assemblies, as can rotor assemblies with any symmetrical or counterbalanced array of rotor arms. It is further contemplated that the spraying apparatus 10 will have seasonal use in citrus orchards for the purpose of preventing frost damage by circulating warm air among the trees without the liquid or dust pesticide.

The invention having thus been described, that which is believed to be new, and for which protection by Letters Patent is desired, is:

1. The method of treating a row of trees that include the steps of confining and discharging an air blast from an individual outlet toward the row of trees, simultaneously moving the confined and discharged air blast in a plane parallel with the row of trees along a circular path about a center point, and simultaneously moving the center point of the circular path along a linear path in the plane.

2. The method described in claim 1, including confining and discharging an air blast towards the row of trees from each individual outlet of a plurality of individual outlets positioned at different radial spacing from the center point, simultaneously moving the confined and discharged air blasts in a plane parallel with the row of trees along circular paths about the center point as determined by the radial spacing therefrom, and simultaneously moving the center point of the circular paths along a linear path in the plane.

3. Agricultural apparatus comprising a vehicle capable of movement along a line of travel parallel with a row of orchard trees, a rotor mounted on said vehicle for rotation about an axis perpendicular to the line of travel of the vehicle and having at least one arm projecting outwardly from the rotor with a free end adapted to revolve in a circular path in a plane parallel to the row of trees, means mounted on said vehicle for generating an air blast, and separate means carried by said arm for confining and directing the air blast from the free end of said rotor arm in an individual spray pattern toward the trees.

4. An agricultural apparatus as described in claim 3 wherein said rotor has a plurality of hollow arms projecting radially outward from the axis of rotation of the rotor and said air blast generating means is an air impeller which rotates about the axis of rotation of the rotor and forces air blasts through the hollow rotor arms.

5. An agricultural apparatus as described in claim 4 wherein said air blast confining and directing means includes an outwardly curved hollow section at the outer end of each rotor arm and interior vanes positioned within the outwardly curved sections for guiding the air flow about the path of the curved sections.

6. An agricultural apparatus as described in claim 4 wherein each rotor arm is telescopically adjustable in length for regulating the position of the air blast confining and directing means from the axis of rotation of the rotor.

7. An agricultural apparatus as described in claim 3 wherein said air blast generating means is an air impeller mounted at the outer end of the rotor arm and said air blast confining and directing means is an annular shroud positioned around the impeller.

8. An agricultural apparatus as described in claim 7 wherein said rotor has a plurality of arms projecting therefrom, each arm having an air impeller mounted at the outer end thereof with an annular shroud positioned around the impeller, and each arm being adjustable in length for regulating the position of the air impeller from the axis of rotation of the rotor.

References Cited

UNITED STATES PATENTS

| | | | |
|---|---|---|---|
| 1,274,886 | 8/1918 | Jacobson | 170—135.21 |
| 2,183,195 | 12/1939 | Kane | 230—254 |
| 2,238,120 | 4/1941 | Launder | 239—77 |
| 2,297,110 | 9/1942 | Parker | 239—655 |
| 2,587,965 | 3/1952 | Campbell | 239—77 X |
| 2,613,109 | 10/1952 | Walker | 239—77 |
| 2,800,746 | 7/1957 | Harmon | 239—160 X |
| 2,807,120 | 9/1957 | Graham | 47—2 |
| 2,925,222 | 2/1960 | Spreng | 239—77 X |
| 3,067,541 | 12/1962 | Smith | 239—77 X |

M. HENSON WOOD, JR., *Primary Examiner.*

V. C. WILKS, *Assistant Examiner.*